D. W. STROUP.
APPARATUS FOR FORMING AXLES.
APPLICATION FILED SEPT. 16, 1907.

1,024,532.

Patented Apr. 30, 1912.
6 SHEETS—SHEET 1.

WITNESSES

INVENTOR

D. W. STROUP.
APPARATUS FOR FORMING AXLES.
APPLICATION FILED SEPT. 16, 1907.
1,024,532.
Patented Apr. 30, 1912.
6 SHEETS—SHEET 2.
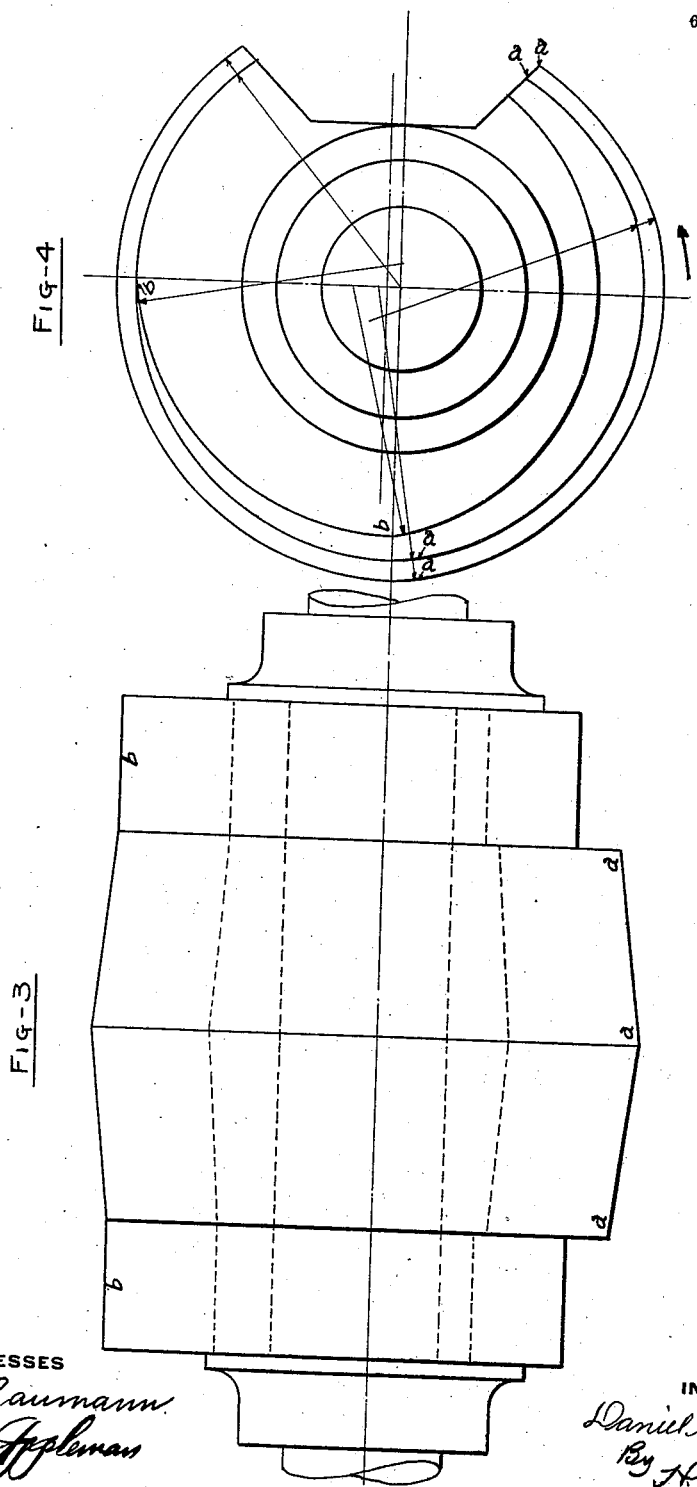
WITNESSES
INVENTOR
Daniel W. Stroup
By H. W. Stirmann
Attorney D. W. STROUP.
APPARATUS FOR FORMING AXLES.
APPLICATION FILED SEPT. 16, 1907.
1,024,532.
Patented Apr. 30, 1912.
6 SHEETS—SHEET 3.
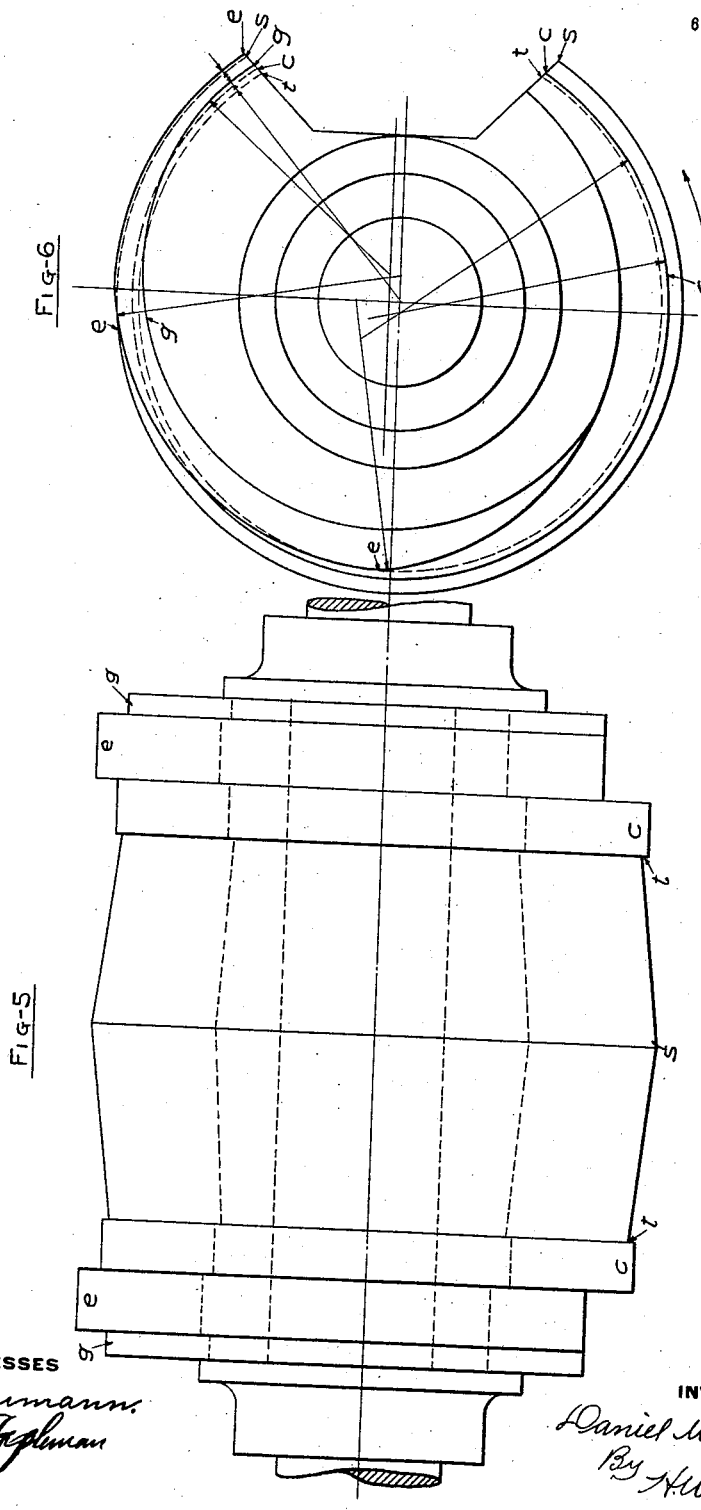

D. W. STROUP.
APPARATUS FOR FORMING AXLES.
APPLICATION FILED SEPT. 16, 1907.

1,024,532.

Patented Apr. 30, 1912.
6 SHEETS—SHEET 4.

WITNESSES
C. A. Baumann.
J. O. Appleman.

INVENTOR
Daniel W. Stroup
By H. W. Stevenson
Attorney

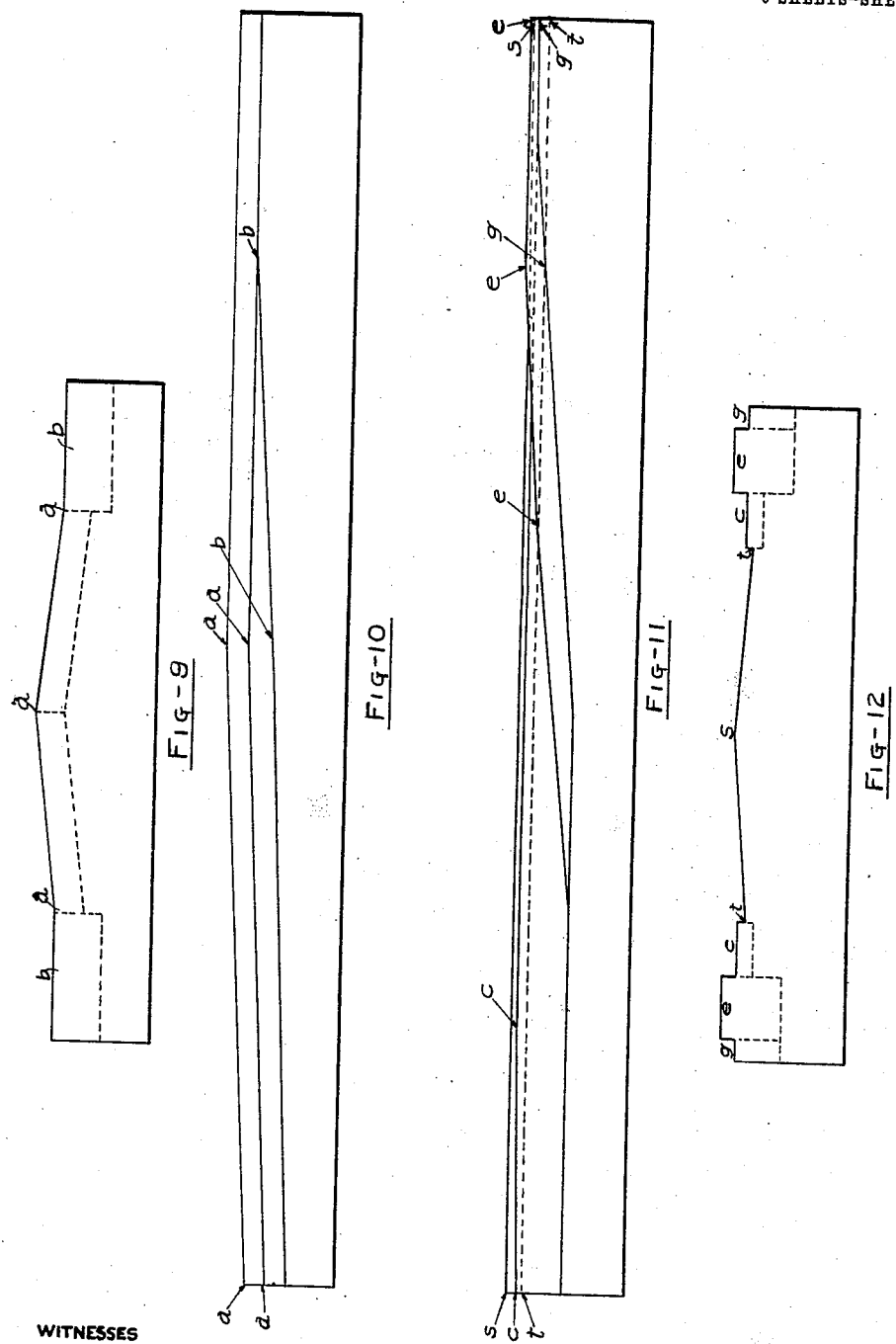

D. W. STROUP.
APPARATUS FOR FORMING AXLES.
APPLICATION FILED SEPT. 16, 1907.

1,024,532.

Patented Apr. 30, 1912.

6 SHEETS—SHEET 6.

WITNESSES
C A Baumann
J P Hoffman

INVENTOR
Daniel W. Stroup
By H. W. Stevenson
Attorney

UNITED STATES PATENT OFFICE.

DANIEL W. STROUP, OF NORTH BRADDOCK, PENNSYLVANIA.

APPARATUS FOR FORMING AXLES.

1,024,532.  Specification of Letters Patent.  Patented Apr. 30, 1912.

Application filed September 16, 1907. Serial No. 393,006.

*To all whom it may concern:*

Be it known that I, DANIEL W. STROUP, a citizen of the United States, residing at North Braddock, in the county of Allegheny and State of Pennsylvania, have invented a new and useful Improvement in Apparatus for Forming Axles, of which improvement the following is a specification.

My invention relates to improvements in apparatus for forming axles.

Figure 1:
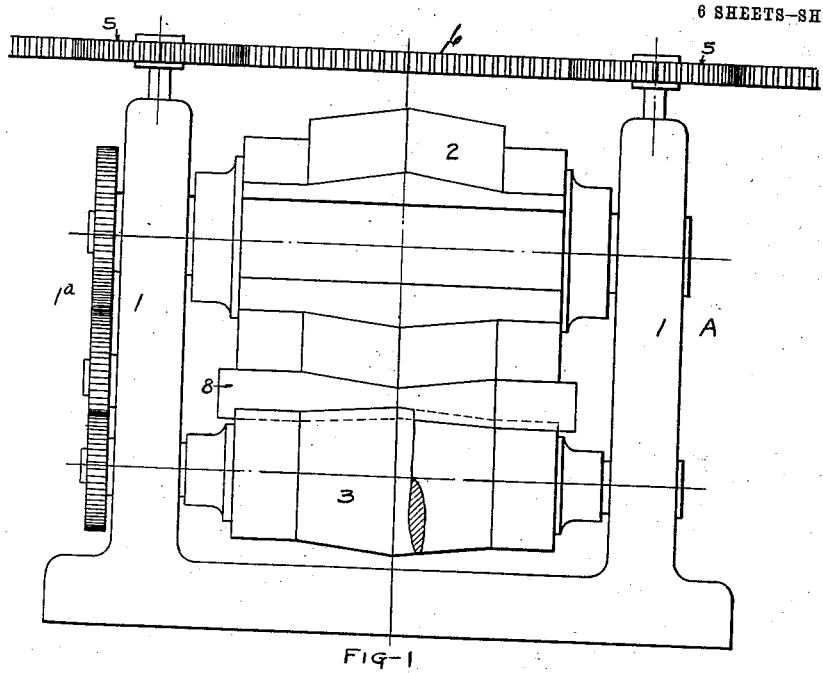
Figure 2:
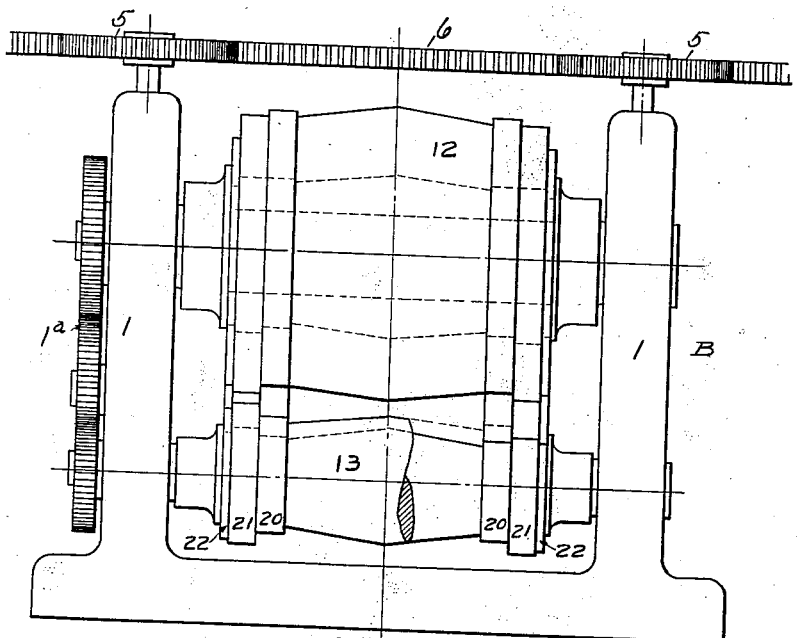
Figure 7:
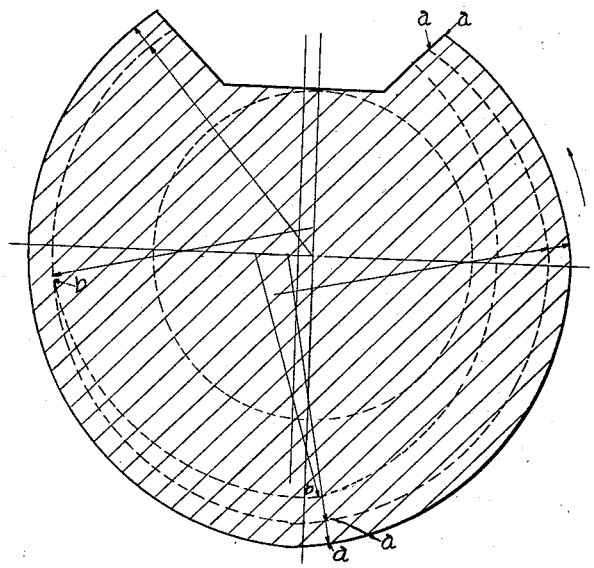
Figure 8:
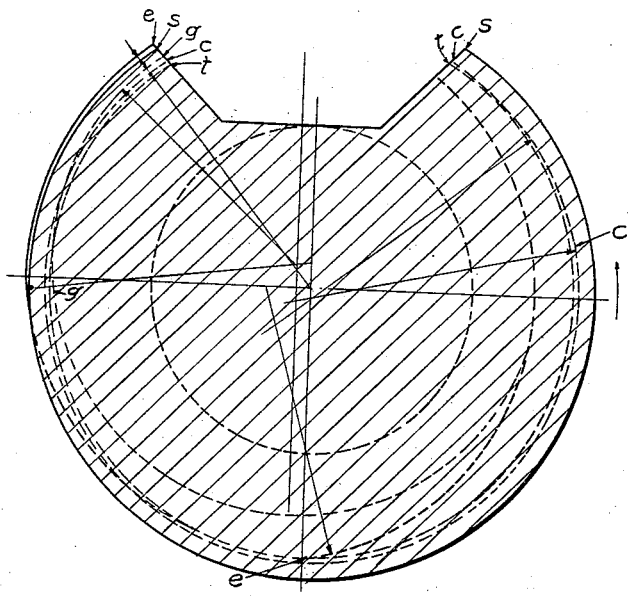
Figure 13:
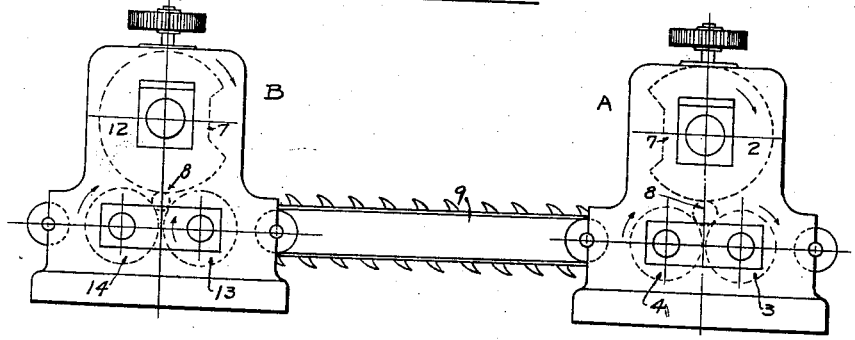
Figure 14:
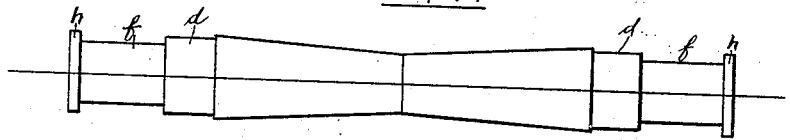

The fundamental object of my invention is to produce an apparatus for forming axles, or other similar shaped articles, either from rolled, solid, or hollow, cast steel or metal ingots or blooms, as the practice may dictate, which will insure a more perfect and satisfactory article than can be produced by the present known methods, and I accomplish this object by means of the apparatus hereinafter specifically described, in which, within the scope of the appended claims, various changes may be made without departing from the original idea and spirit of the invention; reference being had to the accompanying drawings forming a part hereof, in which:

Figure 1 is a longitudinal side elevation of the first or roughing and reducing set of rolls; Fig. 2 is a similar view of the finishing rolls; Fig. 3 is a longitudinal side elevation of the roughing roll; Fig. 4 is an end view of the same illustrating the different radii, and the position of their respective centers; Fig. 5 is a longitudinal side elevation of the finishing roll; Fig. 6 is an end view of the same showing the different radii, and the position of their respective centers; Fig. 7 is a transverse sectional view taken through the center of the roughing roll showing the different radii, and position of their respective centers; Fig. 8 is a similar view of the finishing roll; Fig. 9 is an end view of the roughing roll shown developed on a flat surface; Fig. 10 is a side view of the same roll also developed on a flat surface; Fig. 11 is a side view of the finishing roll also developed on a flat surface, and Fig. 12 is an end view of the same in similar formation; Fig. 13 is an end view in elevation of both sets of rolls showing the same tandem, with a conveyer interposed between; Fig. 14 shows a finished solid axle, and Fig. 15 a finished hollow axle having a tapered mandrel inserted therein.

Referring to the drawings, in which reference numerals and letters designate like parts throughout the different views, 1—1 are suitable housings in which the rolls or rotary presses of both sets are mounted. The first set A involves the rolls 2, 3, and 4, which are adequately positioned and operatively connected by suitable gearing $1^a$, the upper or working roll 2 being approximately twice or more the diameter of each of the lower rolls 3 and 4 respectively. Said roll or rotary press 2 is formed with double centrally disposed eccentric portions $a$, one following the other in consecutive relationship, which eccentrics have different radii, as shown in Figs. 4 and 7; their function being to give approximately a circumferentially uniform reduction to the blank being operated on, the greatest diameter occurring at the longitudinal center of said roll, tapering therefrom toward the ends. Said roll 2 is likewise provided with eccentrics $b$—$b$, adjacent to each end, the eccentricity occurring on the opposite side of the roll to the eccentrics $a$—$a$. The eccentric portion $a$ is for the purpose of reducing the blank 8, which may be either solid or hollow, as shown, at its center, and elongating the same toward the ends, the greatest reduction occurring at the center of the blank, and lessening to a fixed point adjacent each end. The eccentrics $b$—$b$, adjacent to the ends of the roll, act upon the blank 8, during the rotary movement of the rolls, immediately after the eccentric portion $a$ ceases to act, and are for the purpose of further elongation of said blank, and reduction of said ends, preparatory to being passed through the finishing rolls.

The lower rolls 3 and 4 are identical in size and configuration, are similar in form to the upper roll or rotary press, but without the eccentric features, and are geared with said upper roll 2 in such a manner that their paths of revolution will be in the same direction as the path of said upper roll. The blank 8 when inserted between the upper and lower rolls will act as an idler, and be rotated in the opposite direction to said upper rolls, while under the process of shaping and compression.

The finishing rolls B comprise the upper or finishing roll 12, and the lower rolls 13 and 14, which are mounted in housings 1—1, and geared similar to those in the roughing mill A. The said roll 12 is tapered from its longitudinal center toward the ends, the greatest diameter occurring at the said center, and is provided near each end with eccentrics $c$—$c$, adapted to form wheel bearings $d$—$d$ on the finished axle, also with eccentrics $e$—$e$, farther toward the ends of the roll, and on the opposite side of said roll from the eccentrics $c$—$c$, to form the journal bearings $f$—$f$, and immediately following the said roll is provided with eccentrics $g$—$g$ to form the collars $h$—$h$ on the finished axle. On the finishing roll 12 the middle tapered portion, which is not a working part, but simply acts to hold the blank in position while being worked upon and further elongated by the eccentric working parts, is represented by $s$, and $t$—$t$ designates the ends of said middle portion.

The configuration of the two lower rolls 13 and 14 is similar to the upper roll without the eccentric features, but including the collars 20, to assist in forming the wheel bearings $d$; collars 21, to assist in forming the journal bearings $f$; and with collars 22, to assist in forming the collars $h$ on the finished axle. The said rolls 2 and 12 are each provided with a recess 7, longitudinally thereof, at a point in the peripheral working surface between the eccentric portions, for the purpose of permitting the blank to be easily entered in the rolls, or discharged upon the conveyer 9, and carried thereby from the rolls A to the rolls B. Both of said upper rolls are preferably made adjustable in their housings and capable of being raised or lowered by means of the screws 5—5; which may be operated simultaneously by means of the rack 6.

The blank 8 when formed either solid or hollow is made somewhat thicker in cross section, throughout its entire length, than the finished axle will be, and likewise considerably shorter in order to allow for the necessary elongation and reduction, incidental to the rolling and compressing process. When inserted between the roughing rolls A said blank 8 will be subjected to the action of the rotary press 2, reduced and elongated toward each end. This compressing action of the said rotary press 2 will naturally tend to solidify the material, greatly increasing the tensile strength thereof, and prepare the blank for the next succeeding pass and final operation. The partly prepared blank is next carried by the conveyer 9, or by any other suitable means, to the finishing rolls B, and placed between the rolls 12, 13, and 14, where it is further compressed and elongated. The eccentrics $c$—$c$, formed on the rotary press 12, first bite into the metal blank, which is held in position by the non-working portions $s$ and $t$ of said roll, thereby forming wheel bearings $d$—$d$ on the finished axle at each end, then immediately afterward the eccentrics $e$—$e$ likewise bite into the blank, forming the journal bearings $f$—$f$, and immediately afterward the eccentrics $g$—$g$ operate to form the collars $h$—$h$ on the finished axle. The two lower rolls of both sets are geared in such a way that their paths of revolution will be in the same direction as the path of the upper or working rolls, the blank being operated on will describe rotary movement, and be rotated in the opposite direction as said upper roll or rotary press.

The working portion $a$ of the roughing roll 2 is a cut-out or receding eccentric, said portion being of a less diameter throughout its working surface, measuring from the axial center of the roll, than is the other portion of said roll on the opposite side; as will be seen by reference to Figs. 3 and 4 of the drawings. The blank thus furnishes the necessary material to be worked on by the said cut-out eccentric portion.

Figure 15:
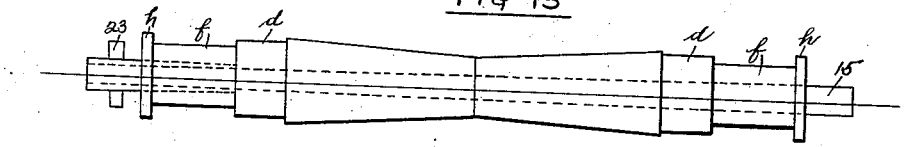

In Fig. 15 I have shown a finished axle made with a hollow or cored out central portion, in which is seated a mandrel 15, utilized during the forming process, and retained in position by a suitable pin 23.

Having thus described and shown my invention, what I claim, and desire to secure by Letters Patent, is:—

1. A mill for forming axles involving supports and comprising roughing and finishing rolls, the top roll or rotary press of the roughing portion having upon its working part double centrally disposed cut-out eccentric portions, having different radii, and following each other in consecutive relationship, and having also eccentrically disposed reducing surfaces at the ends respectively for elongating and reducing the ends of the blank, after the central reduction has ceased, the said last mentioned eccentric surfaces being on the side of the roll opposite to that on which the centrally disposed eccentric portions are formed, said central portion also being so shaped that the portion which is upon the part of the member which performs the last part of the rolling can remain in engagement with the blank without materially elongating and reducing the central portion of said blank, the top roll or rotary press of the finishing rolls having a non-reducing concentric portion, and a plurality of eccentrically disposed reducing surfaces formed on the ends, in successive relation, and adapted to successively act upon the blank to form wheel bearings, journal bearings, and collars thereon.

2. A mill for forming axles involving supports and comprising roughing and finishing rolls, the roughing roll having upon its working part double centrally disposed cut-out eccentric portions having different radii and following each other in consecutive relationship, and having, on the opposite side of the roll to the central eccentric portions, also eccentrically disposed reducing surfaces adjacent the ends respectively, adapted to engage and reduce the blank immediately after the central reducing eccentric surface has ceased to act, said central portion also being so shaped that the portion which is upon the part of the member which performs the last part of the rolling can remain in engagement with the blank without materially elongating and reducing the central portion of said blank, the finishing roll having a non-reducing concentric surface intermediate of the ends, and a plurality of eccentrically disposed reducing surfaces adjacent the ends thereof, adapted to successively act upon the blank to form wheel bearings, journal bearings, and collars, and lower rolls having similar configuration to the upper rolls but without the eccentric features; substantially as described and shown.

In testimony whereof, I have hereunto signed my name in the presence of two subscribing witnesses.

DANIEL W. STROUP.

In the presence of—
CLARENCE A. WILLIAMS,
JAMES C. HERRON.

Copies of this patent may be obtained for five cents each, by addressing the "Commissioner of Patents, Washington, D. C."